Dec. 31, 1968

B. I. T. LARSON 3,418,870

MECHANIC GEAR INTENDED FOR LOWERING RAILROAD GUARD BARS

Filed July 25, 1966

Bertil Ivar Torsten Larson,
INVENTOR

BY Wenderoth, Lind and Ponack,
Attorneys

Dec. 31, 1968    B. I. T. LARSON    3,418,870
MECHANIC GEAR INTENDED FOR LOWERING RAILROAD GUARD BARS
Filed July 25, 1966

INVENTOR,
Bertil Ivar Torsten Larson
BY Wenderoth, Lind
and Ponack,
Attorneys

United States Patent Office 3,418,870
Patented Dec. 31, 1968

3,418,870
MECHANIC GEAR INTENDED FOR LOWERING RAILROAD GUARD BARS
Bertil Ivar Torsten Larson, Norrgard, Bredaryd, Sweden
Filed July 25, 1966, Ser. No. 567,606
5 Claims. (Cl. 74—625)

ABSTRACT OF THE DISCLOSURE

A gear for lowering railroad guard bars of level crossing gates having an intermediate shaft between an input shaft and an output shaft. A moment clutch is arranged between the input shaft and the intermediate shaft. This intermediate clutch is adapted at the surpassing of a certain torque on the output shaft to be automatically discoupled and at the drop below this torque to be re-engaged automatically. There is between the intermediate shaft and the input shaft on one hand and the output shaft on the other hand a worm gear and the moment clutch is arranged on the intermediate shaft between this latter shaft and the worm gear belonging to the input shaft. The railroad guard bar is arranged on one end of the output shaft and the input shaft is driven by a motor. The moment clutch has a coupling half which is carried freely rotatably but axially undisplaceably on the intermediate shaft and is driven by the input shaft and a coupling half which is carried non-rotatably on the intermediate shaft but is axially displaceable against the action of a spring. The gear ratio—obtainable by means of a worm gear—between the intermediate shaft and the output shaft is preferably chosen in such a way that there is obtained a self-braking effect.

---

Figure 1:
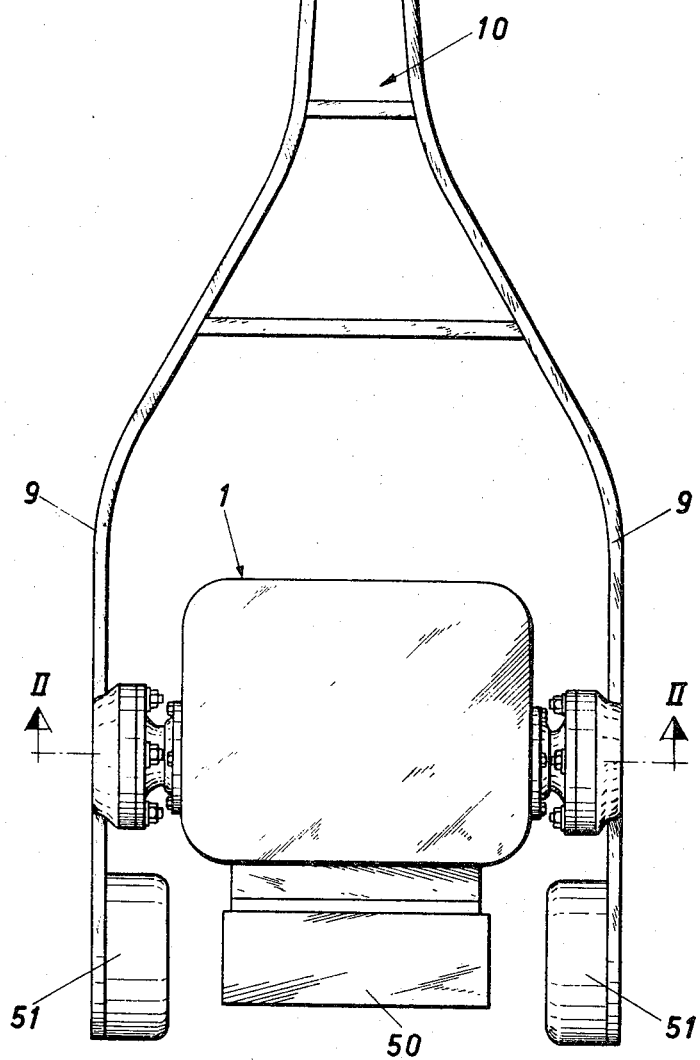

The present invention has reference to a gear for lowering railroad guard bars of level crossing gates of the kind provided with an intermediate shaft between an input shaft and an output shaft and a moment clutch arranged between the input shaft and the intermediate shaft. This intermediate clutch is adapted at the surpassing of a certain torque on the output shaft to be automatically discoupled and at the drop below this torque to be re-engaged automatically. There is between the intermediate shaft and the input shaft on one hand and the output shaft on the other hand according to the invention arranged a worm gear and the moment clutch is arranged on the intermediate shaft between this latter shaft and the worm gear belonging to the input shaft. The railroad guard bar is arranged on one end of the output shaft and the input shaft is driven by a motor. The moment clutch comprises a coupling half which is carried freely rotatably but axially undisplaceably on the intermediate shaft and is driven by the input shaft and a coupling half which is carried non-rotatably on the intermediate shaft but is axially displaceable against the action of a spring. The gear ratio—obtainable by means of a worm gear—between the intermediate shaft and the output shaft is preferably chosen in such a way that there is obtained a self-braking effect.

The most eminent advantages obtained with the device according to the invention are as follows. When the bar is in erected position, it remains in vertical or inclining position due to the said self braking effect and this effect is obtained also at strong winds. When the bar is lowered and the lowering movement is stopped by any object, the moment clutch will instantly be effective and disengage the intermediate shaft from the driving input shaft. The bar is then arrested in its movement. In case at a lowered bar the latter for any reason is loaded, e.g., by means of playing children climbing on the bar, and the motor is started, the moment clutch is again disengaged which means that the driving shaft can continue to rotate whilst the intermediate shaft and the bar will remain in the initial position. As soon as the load is removed from the bar, the moment clutch is again engaged due to the spring and the bar is erected.

According to a preferred embodiment, the axially displaceable coupling half is carried on balls inserted in a groove extending in the intermediate shaft in the longitudinal direction of the same and a corresponding notch arranged internally in the hub of this coupling half. Due to this arrangement the moment clutch will be quickly brought to action.

According to a further embodiment of the invention the spring is inserted between one end of the hub of the displaceable coupling half and a set nut screwed on the free end in question of the intermediate shaft so as to control the tensional force of the spring. It is thereby rendered possible to adjust in an easy way the torque size in the moment clutch.

When the moment coupling comprises on one hand a coupling half which is freely turnable but axially undisplaceable on the intermediate shaft and driven by the input shaft and on the other hand a coupling half which is unturnable but, against the action of a spring, axially displaceable, it is according to a preferred embodiment of the invention advisable that last mentioned coupling half is adapted to be axially displaced away from the first mentioned coupling half by means of a crank journalled on the end of the intermediate shaft, this crank being provided with a driving means by means of which the crank can be coupled directly to the intermediate shaft.

Figure 2:
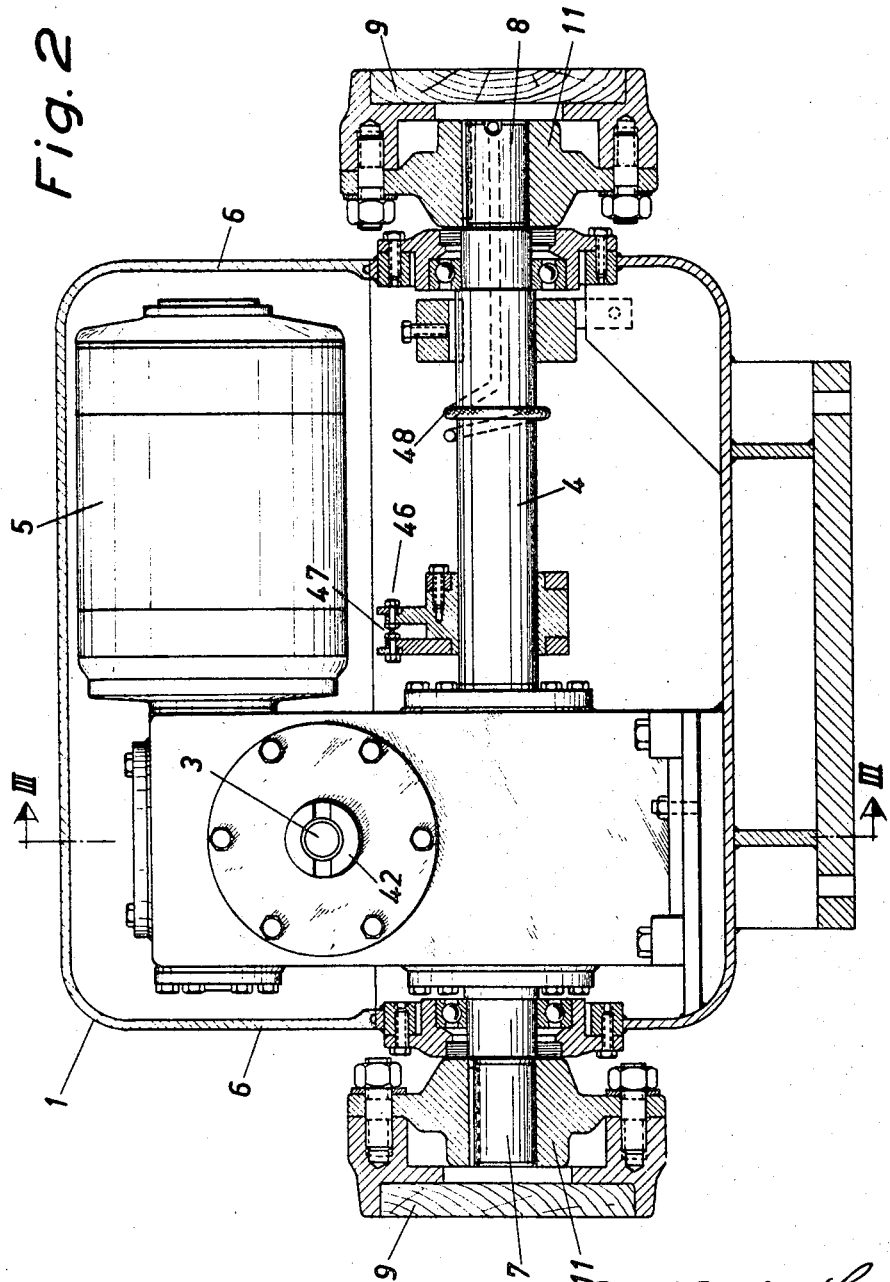
Figure 3:
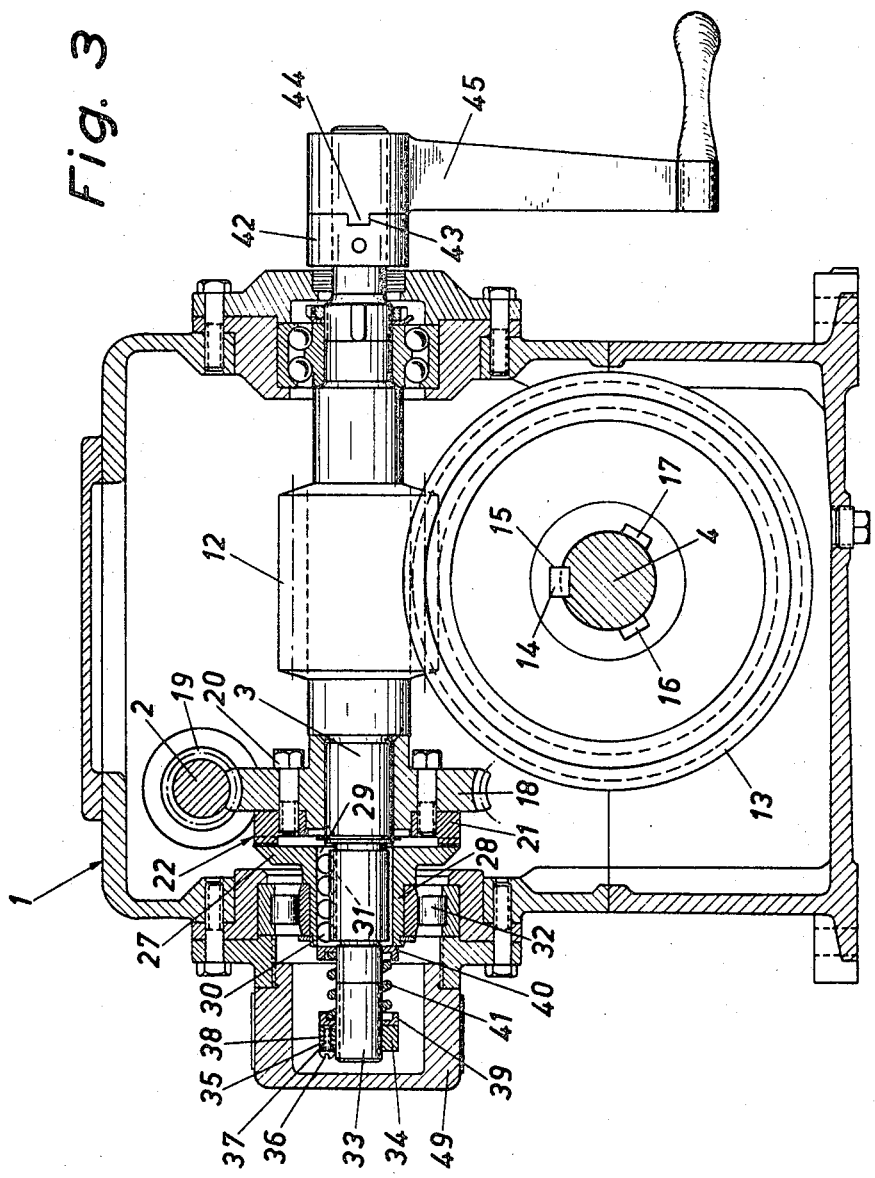
Figure 4:
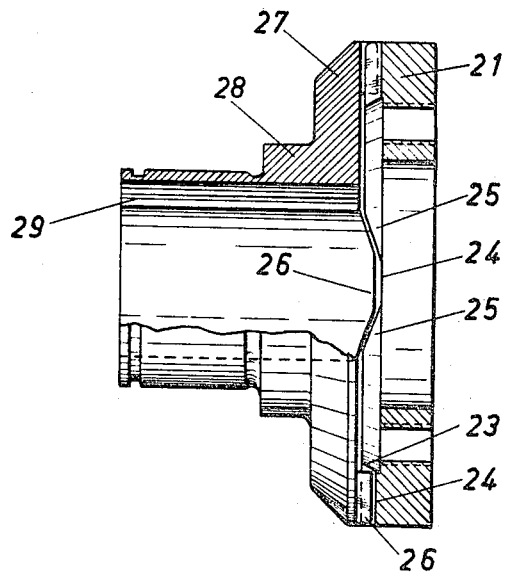
Figure 5:
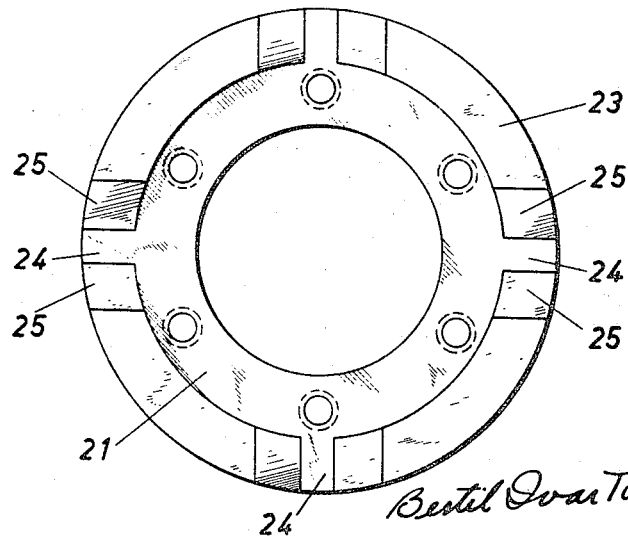
Figure 6:
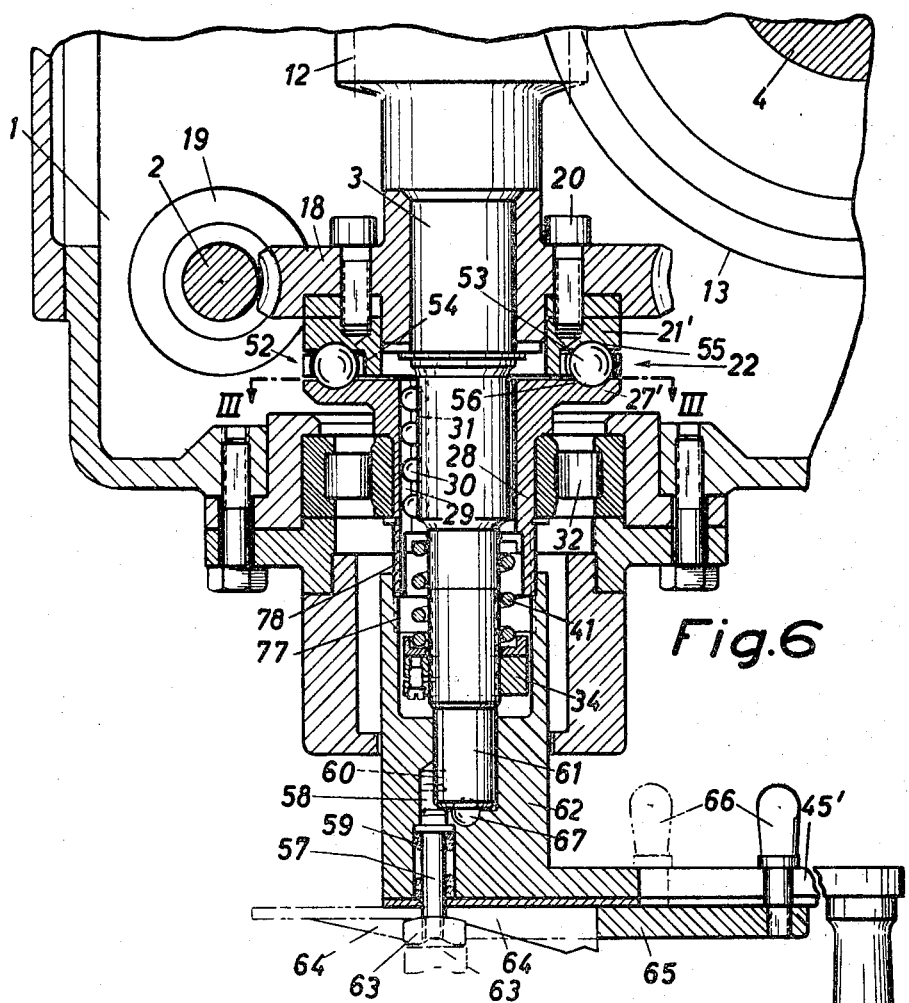
Figure 7:
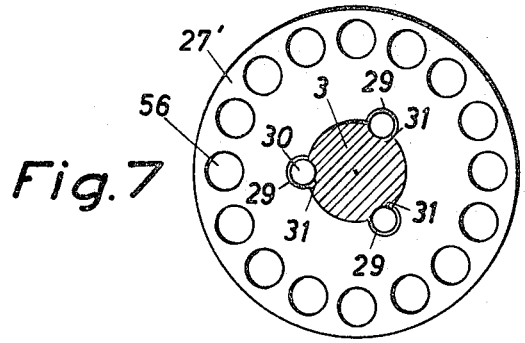

The invention will now be described for purposes of illustration with reference to the accompanying drawings. In the drawings:

FIG. 1 is a partly broken plan view of a gear carrying on its output shaft a railroad guard bar, this bar being shown in its lowered position, FIG. 2 shows a vertical section through the gear in FIG. 1 on the line II—II in this figure, FIG. 3 shows a vertical cross section on the line III—III in FIG. 2 through the gear, FIG. 4 shows on an enlarged scale a partly broken section through the moment coupling with its two coupling halves in engagement with each other, FIG. 5 is an end view of one of the coupling halves, FIG. 6 shows on an enlarged scale a vertical section through a gear with a moment clutch according to the invention according to another embodiment, and FIG. 7 shows a cross section through the coupling on the line VII—VII in FIG. 6.

The gear is provided with three shafts 2, 3, and 4 journalled in its gear box 1. The shaft 2 will in the following be denoted the input shaft and is driven for rotation by means of an electric motor 5, and the shaft 4 will in the following be denoted the output shaft and extends with its ends 7, 8 outside the gable walls 6 of the gear box 1 and is on these ends 7 and 8 provided with hubs 11 serving as attachments for the two longitudinal branches 9 of the railroad guard bar 10. The intermediate shaft 3 is shaped as a worm gear 12 which coacts with a worm wheel 13 on the output shaft 4. The worm wheel 13 is by means of a wedge 14 attached to the shaft 4. The wedge 14 can be brought to engage one of three wedge notches 15, 16, or 17 which are mutually displaced 120°. Due to this arrangement the worm wheel 13 which with the worm screw 12 acts only along one quadrant, can be taken full advantage of for the reason that, when the teeth of one quadrant are worn out, one can turn the wheel 120° in such a way that thereupon new teeth are brought to coact with the worm screw 12.

On the intermediate shaft 3 there is carried for free rotation a worm wheel 18 which coacts with a worm screw 19 on the input shaft 2. By means of bolts 20 there is on the worm wheel 18 attached a coupling half 21 of a moment clutch 22. The coupling half 21 which is shown on an enlarged scale in FIGS. 4 and 5 is provided with a laterally directed annular flange 23 in which there is arranged for notches 24 arranged in front of each other and provided with inclining side surfaces. In each one of these notches 24 there engage abutments 26 shaped in a corresponding way on the other coupling half 27. The latter is internally of the hub provided with a notch 29 extending in the longitudinal direction and in this notch there engages a number of balls 30 serving as drivers and being inserted in one or several, preferably three, longitudinally extending notches 31 in the shaft 3. The hub 28 carries a ball bearing 32 by means of which the intermediate shaft 3 at one end 33 is carried in the gear box 1. There is on this shaft end 33 screwed a set nut 34 provided with a transversally extending slot 35 which is bridged by a lock screw 36 by means of which the portions 37 and 38 of the nut 34 on either side of the slot 36 can be clamped together in adjusted position. There is between a washer 39 on the inside of the nut 34 and a washer 40 on the outside of the hub 28 put a helical spring 41. This spring tends to keep the abutments 26 on the coupling half 27 in engagement with the notches 24 in the coupling half 21.

The intermediate shaft 3 is at its opposite end provided with a sleeve 42 having notches 43 in the outer end surface and abutments 44 engage in these notches 43, last mentioned notches 43 being arranged on a crank 45 put on this end of the shaft 3.

There is on the output shaft 4 arranged a contactor 46 with adjustable cams which influence a number of electric contact elements 47 which during the turning of the shaft 4 are closed and disconnected and thereby indicate the position of the bar by means of coupling lamps inserted in the same current direction as the elements 47 in a switch gear at a railway station in the neighborhood and which via an electric conduit 48 closes and cuts off the current to a lamp (not shown) on the railroad guard bar 10 or changes the light of the lamp from white to red or vice versa.

When the railroad guard bar 10 form the erected position is to be lowered, the drive engine 5 is started. The shaft 2 drives with its worm screw 19 the worm wheel 18 and this in turn drives the intermediate shaft 3 via the coupling halves 21 and 27. The motive force between the coupling half 27 and the shaft 3 is transmitted via the balls 30. The intermediate shaft 3 drives via the worm screw 12 and the worm wheel 13 the output shaft 4 and due to the turning of the same also the bar 10 is swung by means of the hub 11. When the bar 10 with its outer end in its lowered position is caught by means of a fork-shaped support or during its lowering meets an obstacle, the inclining surfaces 25 of the flange 23 on the coupling half 21 brought along will press against the driving abutments 26 and force these abutments by means of an axial displacement of the coupling half 27 out of engagement of the notches 24 against the action of the spring 41. Thus, the intermediate shaft is disengaged momentarily from the driving shaft 2 and the shaft 4 with the bar 10 remains in the position it assumed when it met the obstacle. Due to the balls 30 in the notches 29 and 31, the moment coupling will have a very quick reaction. The torque moment to be overcome is completely determined by the force of the spring 41 and the inclining of the surfaces 25. As soon as the resistance ceases or the shaft stops its rotation (the electric current to the engine 5 has been cut off), the coupling half 27 by means of the spring 41 is displaced again to its operative coupling position. Also at the erection of the bar 10 the moment coupling will be brought to action when the bar is exposed to any resistance which causes a torque moment of a value exceeding the one to which the moment coupling is adjusted. As soon as the resistance ceases, the spring 41 again displaces the coupling half 27 to its operative coupling position.

In case of an interruption of the current to the engine 5 it is possible to lower or to erect the bar 10 by means of the crank 45 via the intermediate shaft 3 and the output shaft 4.

The nut 34 is easily available after the removal of a cap 49 so as to render possible at need an adjustment of the force of the helical spring 41.

As obvious from FIG. 1, the gear box 1 is arranged on the upper end of a post 50. The branches 9 of the bar 10 are on one end provided with counter weights 51.

According to the embodiment shown in FIGS. 6 and 7 of the moment coupling there is between the coupling halves 21' and 27' inserted a ring of balls 52 the balls 53 of which are kept at a constant mutual distance by a ball cage 54 and which engage in notches 55, 56 arranged in the coupling halves 21' and 27' and taking the shape of segments of spheres.

Due to the helical spring 41 the force of which can be varied by means of the set nut 34, the coupling half 27' is under intermediary of the balls 53 kept in engagement with the coupling half 21' such that the motive force from the input shaft 2 is transmitted via the worm screw 19, the worm wheel 18, the coupling half 21', the ring of balls 52 and the coupling half 27' to the intermediary shaft 3 so as to be, via the worm screw 12 and the worm wheel 13, transmitted also to the output shaft 4 and thus to the railroad guard bar. However, if this bar for any reason is exposed to a load, e.g. playing children climbing on the bar, and the motor is started so as to erect the bar, the moment coupling is brought to operation, i.e. the coupling half 21' will at its continuous rotation press the balls 53 out of the notches 55 in this coupling half whilst axially displacing the coupling half 27' downwards according to FIG. 6 against the action of the spring 41. Thus, the coupling half 21' will continue to rotate while the coupling half 27' and thus also the shafts 3 and 4 will remain stationary. Every time the balls 53 will be situated in front of a notch 55 in the coupling half 21', the coupling half 27' will have a possibility to be displaced upwards according to FIG. 6 by the action of the spring 41 to a renewed engagement but for the reason that the torque moment adjusted by means of the spring 41 is still lower than the torque moment exerted on the coupling, the coupling will remain disengaged. The continued rotation will take place with only a slight ticking noise in the moment coupling. Only when the abnormal high resistance on the output shaft 4 ceases, the coupling will again be automatically brought to action.

The intermediate shaft 3 is provided with a crank 45' which by means of a driver piston 57 can be coupled to the intermediate shaft such that it is rendered possible at need to turn this shaft manually and thus also the output shaft 4. It is hereby rendered possible, as will be obvious from the following, e.g. at interruptions in the current fed to the engine to erect the railroad guard bar manually by means of a crank.

The inner end 58 of the driver piston 57 is, by means of the action of a spring 59, axially insertable into a notch 60 in the end 61 of the intermediate shaft 3 on which the hub 62 of the crank 45' is journalled. The driver piston 57 is at its outer end provided with a head 63 and a releaser wedge 64 provided with a slide 65 could be moved in under this head. The slide is displaceable along the crank 45' by means of a finger grip 66. Between the crank hub 62 and the end of the intermediate shaft 3 there is inserted a ball 67 serving as a grate. The hub 62 is provided with internal threads 77 which cooperate with corresponding external threads 78 on the hub 28 of the coupling half 27'.

When, e.g., at current interruptions one wishes to erect the railroad guard bar manually by means of a crank, the slide 65 with the releaser wedge is first displaced to the left according to FIG. 6 whereby the driver piston 57, against the action of the spring 59, is displaced downwards and thereby the crank is brought out of engagement with the intermediate shaft 3. It should in this connection be pointed out that at normal operation of the gear the crank 45' always will be out of engagement and thus during the rotation of the intermediate shaft 3 will depend freely (thus the releaser wedge 64 and the driver piston 57 assume the position shown with dash and dot lines in FIGURE 6). When thereupon the crank 45' is turned to the right (the treads 77 of the crank hub are right hand threads) the coupling half 27' is screwed axially into the crank hub 62 which thus causes the input shaft 2 with its gear 18, 19 to be discoupled from the intermediate shaft 3. When the slide 65 thereupon with the wedge 64 again is displaced to the right according to FIG. 6, the driver piston 57 is displaced with its end 58 by the action of the spring 59 into the notch 60 in the intermediate shaft 3 which thus is coupled to the crank 45'. By means of this crank it is then easy to erect the bar manually by means of a crank via the intermediate shaft 3, the gear 12, 13 and the output shaft 4.

The invention has been described only for purposes of illustration in the aforegoing and is not intended to be limited by this description or otherwise except as defined in the appended claims. Thus, the different portions of the gear, in particular the different portions of its moment clutch may be modified in many ways without departure from the inventive idea. So as to render possible, at different temperatures, a safe axial displacement of the coupling half 27', the balls 30 are of special value but also other kinds of drivers may be used which render possible this axial displacement of the coupling half 27' but prevent a turning in relation to the shaft 3. The notches 55, 56 in the coupling halves 21', 27' may comprise cylindrical bores having a suitable inner diameter in such a way that the pushing in (the engagement) of the balls in the notches will be the intended one.

What I claim is:

1. A gear for lowering and erecting railroad guard bars of level crossing gates, an electric motor driving an input shaft, an output shaft, a railroad guard bar arranged on said output shaft, a moment clutch adapted at the exceeding of a defined torque moment to be automatically disengaged and at a drop below said torque moment to be automatically re-engaged, said gear comprising an intermediate shaft, a worm gear arranged between said intermediate shaft and on one hand said input shaft and on the other hand said output shaft, said moment clutch being arranged on said intermediate shaft between said shaft and the worm gear associated with said input shaft, a crank arranged on said intermediate shaft for turning said shaft, said moment clutch comprises on one hand a first coupling half arranged on said intermediate shaft and carried on said shaft freely rotatable but axially undisplaceable and driven by means of said input shaft and on the other hand a coupling half arranged on said intermediate shaft, said last mentioned coupling half carried on said intermediate shaft being non-rotatable but axially displaceable against the action of a spring, said last mentioned coupling half being arranged to be displaced away from said first mentioned coupling half by means of a crank journalled on one end of said intermediate shaft, said crank being provided with driver means to couple said crank directly to said intermediate shaft, said crank having a hub provided with screw threads to cooperate with corresponding screw threads of the hub of the axially displaceable coupling half in such a way that at a rotation of the crank which is rotatable but axially displaceable in relation to the same in one direction this coupling half will be axially displaceable out of engagement with said second coupling half.

2. A gear as claimed in claim 1 wherein a grate is inserted between said crank hub and the end of said intermediate shaft engaging said hub.

3. A gear as claimed in claim 2 wherein said grate has the shape of a ball.

4. A gear for lowering and erecting railroad guard bars of level crossing gates, an electric motor driving an input shaft, an output shaft, a railroad guard bar arranged on said output shaft, a moment clutch adapted at the exceeding of a defined torque moment to be automatically disengaged and at a drop below said torque moment to be automatically re-engaged, said gear comprising an intermediate shaft, a worm gear arranged between said intermediate shaft and on one hand said input shaft and on the other hand said output shaft, said moment clutch being arranged on said intermediate shaft between said shaft and the worm gear associated with said input shaft, a crank arranged on said intermediate shaft for turning said shaft, a hub on said crank, a driver piston displaceably carried in said hub parallel to said intermediate shaft, said intermediate shaft having a notch, said driver piston adapted to be, with its inner end, pushed into said notch in the intermediate shaft for coupling said shaft to said crank.

5. A gear as claimed in claim 4 wherein a releaser wedge is displaceable in said crank, said displaceable wedge being adapted at its displacement in one direction to displace, against the action of a spring, said driver piston out of engagement with said notch in said intermediate shaft.

References Cited

UNITED STATES PATENTS

| 1,913,046 | 6/1933 | Callan | 192—67 |
| 2,703,991 | 3/1955 | Kron et al. | 74—625 |
| 2,772,578 | 12/1956 | Kling | 74—625 |

FRED C. MATTERN, Jr., *Primary Examiner.*

W. S. RATLIFF, *Assistant Examiner.*